United States Patent
Chan

(10) Patent No.: US 11,777,404 B1
(45) Date of Patent: Oct. 3, 2023

(54) POWER SUPPLY DEVICE FOR SUPPRESSING MAGNETIC SATURATION

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 17/841,827

(22) Filed: Jun. 16, 2022

(51) Int. Cl.
*H02M 1/40* (2007.01)
*H02M 3/335* (2006.01)
*H02M 3/00* (2006.01)

(52) U.S. Cl.
CPC ......... *H02M 1/40* (2013.01); *H02M 3/33569* (2013.01); *H02M 3/01* (2021.05); *H02M 3/33571* (2021.05)

(58) Field of Classification Search
CPC ............... H02M 3/01; H02M 3/33569; H02M 3/33571; H02M 1/40
See application file for complete search history.

(56) References Cited

U.S. PATENT DOCUMENTS

| 10,581,319 B1 * | 3/2020 | Lin .................. H02M 3/33553 |
| 2011/0299304 A1 * | 12/2011 | Coley .................... H02M 1/40 |
| | | 363/21.09 |
| 2015/0100174 A1 * | 4/2015 | Li ......................... H02M 3/156 |
| | | 700/298 |

* cited by examiner

*Primary Examiner* — Jue Zhang
(74) *Attorney, Agent, or Firm* — McClure, Qualey & Rodack, LLP

(57) ABSTRACT

A power supply device for suppressing magnetic saturation includes a bridge rectifier, a boost inductor, a power switch element, a first PWM (Pulse Width Modulation) IC (Integrated Circuit), a first output stage circuit, an input switch circuit, a transformer, a first capacitor, a second output stage circuit, and a detection and control circuit. A leakage inductor and a magnetizing inductor are built in the transformer. The detection and control circuit includes an NTC (Negative Temperature Coefficient) resistor disposed adjacent to the transformer. The detection and control circuit detects the first voltage slope relative to the power switch element, and it detects the second voltage slope relative to the first output stage circuit. The detection and control circuit limits the inductive current flowing through the magnetizing inductor according to the first voltage slope, the second voltage slope, and the feedback voltage from the NTC resistor.

15 Claims, 6 Drawing Sheets

US 11,777,404 B1

POWER SUPPLY DEVICE FOR SUPPRESSING MAGNETIC SATURATION

CROSS REFERENCE TO RELATED APPLICATIONS

This Application claims priority of Taiwan Patent Application No. 111108489 filed on Mar. 9, 2022, the entirety of which is incorporated by reference herein.

BACKGROUND OF THE INVENTION

Field of the Invention

The disclosure generally relates to a power supply device, and more specifically, to a power supply device for suppressing magnetic saturation.

Description of the Related Art

In a conventional power supply device, a magnetizing inductor is built into a transformer. However, each magnetic element is normally used within range of a hysteresis curve. When the temperature of the transformer is too high and the inductive current flowing through the magnetizing inductor is too large, the magnetizing inductor may enter a state of magnetic saturation. Its magnetization characteristics may vanish and lead to safety problems. Accordingly, there is a need to propose a novel solution for solving the problems of the prior art.

BRIEF SUMMARY OF THE INVENTION

In an exemplary embodiment, the invention is directed to a power supply device for suppressing magnetic saturation. The power supply device includes a bridge rectifier, a boost inductor, a power switch element, a first PWM (Pulse Width Modulation) IC (Integrated Circuit), a first output stage circuit, an input switch circuit, a transformer, a first capacitor, a second output stage circuit, and a detection and control circuit. The bridge rectifier generates a rectified voltage according to a first input voltage and a second input voltage. The boost inductor receives the rectified voltage. The power switch element selectively couples the boost inductor to a ground voltage according to a first PWM voltage. The first PWM IC generates the first PWM voltage. The first output stage circuit is coupled to the boost inductor, and is configured to generate a middle voltage. The input switch circuit generates a switching voltage according to the middle voltage. The transformer includes a main coil, a first secondary coil, and a second secondary coil. A leakage inductor and a magnetizing inductor are built in the transformer. The main coil receives the switching voltage through the leakage inductor. The first capacitor is coupled to the main coil. The second output stage circuit is coupled to the first secondary coil and the second secondary coil, and is configured to generate an output voltage. The detection and control circuit includes an NTC (Negative Temperature Coefficient) resistor disposed adjacent to the transformer. The detection and control circuit detects the first voltage slope relative to the power switch element, and it detects the second voltage slope relative to the first output stage circuit. The detection and control circuit limits the inductive current flowing through the magnetizing inductor according to the first voltage slope, the second voltage slope, and feedback voltage from the NTC resistor.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
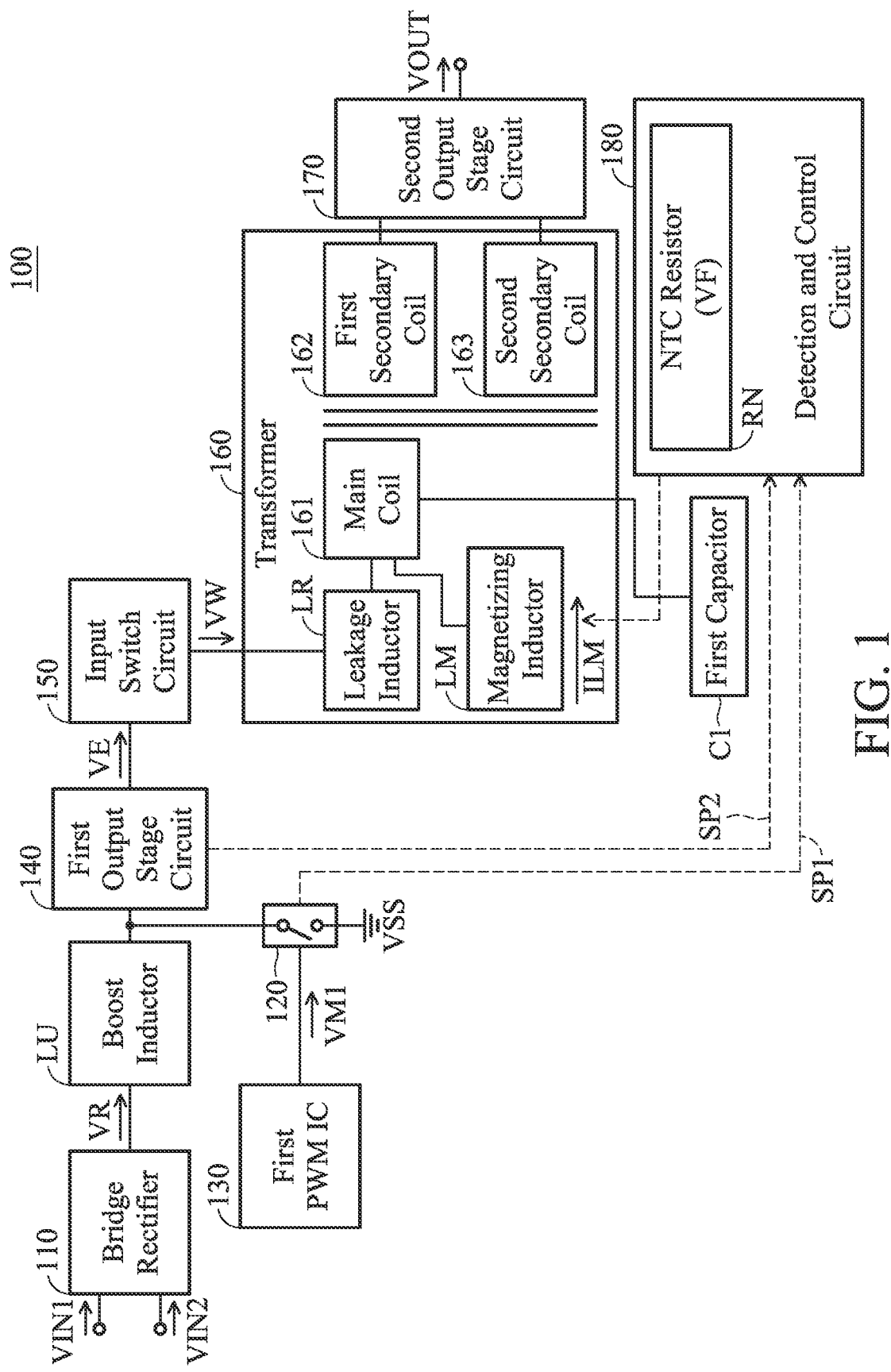
FIG. 1 is a diagram of a power supply device according to an embodiment of the invention.

FIG. 1 is a diagram of a power supply device 100 according to an embodiment of the invention. For example, the power supply device 100 may be applied to a desktop computer, a notebook computer, or an all-in-one computer. As shown in FIG. 1, the power supply device 100 includes a bridge rectifier 110, a boost inductor LU, a power switch element 120, a first PWM (Pulse Width Modulation) IC (Integrated Circuit) 130, a first output stage circuit 140, an input switch circuit 150, a transformer 160, a first capacitor C1, a second output stage circuit 170, and a detection and control circuit 180. It should be noted that the power supply device 100 may further include other components, such as a voltage regulator and/or a negative feedback circuit, although they are not displayed in FIG. 1.

The bridge rectifier 110 generates a rectified voltage VR according to a first input voltage VIN1 and a second input voltage VIN2. An AC (Alternating Current) voltage difference with any frequency and any magnitude may be formed between the first input voltage VIN1 and the second input voltage VIN2. For example, the frequency of the AC voltage difference may be about 50 Hz or 60 Hz, and the RMS (Root-Mean-Square) value of the AC voltage difference may be from about 90V to 264V, but they are not limited thereto. The boost inductor LU receives the rectified voltage VR. The power switch element 120 selectively couples the boost inductor LU to a ground voltage VSS (e.g., 0V) according to a first PWM voltage VM1. For example, if the first PWM voltage VM1 has a high logic level, the power switch element 120 may couple the boost inductor LU to the ground voltage VSS (i.e., the power switch element 120 is similar to a short-circuited path). Conversely, if the first PWM voltage VM1 has a low logic level, the power switch element 120 may not couple the boost inductor LU to the ground voltage VSS (i.e., the power switch element 120 is similar to an open-circuited path). The first PWM IC 130 generates the first PWM voltage VM1. The first output stage circuit 140 is coupled to the boost inductor LU, and is configured to generate a middle voltage VE. The input switch circuit 150 generates a switching voltage VW according to the middle voltage VE. The transformer 160 includes a main coil 161, a first secondary coil 162, and a second secondary coil 163. A leakage inductor LR and a magnetizing inductor LM are built in the transformer 160. The main coil 161, the leakage inductor LR, and the magnetizing inductor LM may be positioned at the same side of the transformer 160. The first secondary coil 162 and the second secondary coil 163 may be positioned at the opposite side of the transformer 160. The main coil 161 receives the switching voltage VW through the leakage inductor LR. The first secondary coil 162 and the second secondary coil 163 can be operated according to the switching voltage VW. The first capacitor C1 is coupled to the main coil 161. For example, a resonant tank may be formed by the leakage inductor LR, the magnetizing inductor LM, and the first capacitor C1. The second output stage circuit 170 is coupled to the first secondary coil 162 and the second secondary coil 163, and is configured to generate an output voltage VOUT. For example, the output voltage VOUT may be a DC (Direct Current) voltage, whose voltage level may be from 18V to 20V, but it is not limited thereto. The detection and control circuit 180 includes an NTC (Negative Temperature Coefficient) resistor RN disposed adjacent to the transformer 160. The detection and control circuit 180 can detect the first voltage slope SP1 relative to the power switch element 120, and it can detect the second voltage slope SP2 relative to the first output stage circuit 140. It should be noted that the term "adjacent" or "close" over the disclosure means that the distance (spacing) between two corresponding elements is smaller than a predetermined distance (e.g., 5 mm or shorter), or means that the two corresponding elements directly touch each other (i.e., the aforementioned distance/spacing therebetween is reduced to 0). Next, the detection and control circuit 180 can limit the inductive current ILM flowing through the magnetizing inductor LM according to the first voltage slope SP1, the second voltage slope SP2, and a feedback voltage VF from the NTC resistor RN. With such a design, even if the temperature of the transformer 160 becomes higher, the inductive current ILM flowing through the magnetizing inductor LM can be still appropriately controlled, and it can effectively prevent the magnetizing inductor LM from accidentally entering a state of magnetic saturation. Therefore, the whole security and reliability of the power supply device 100 can be significantly improved.

The following embodiments will introduce the detailed structure and operation of the power supply device 100. It should be understood these figures and descriptions are merely exemplary, rather than limitations of the invention.

Figure 2:
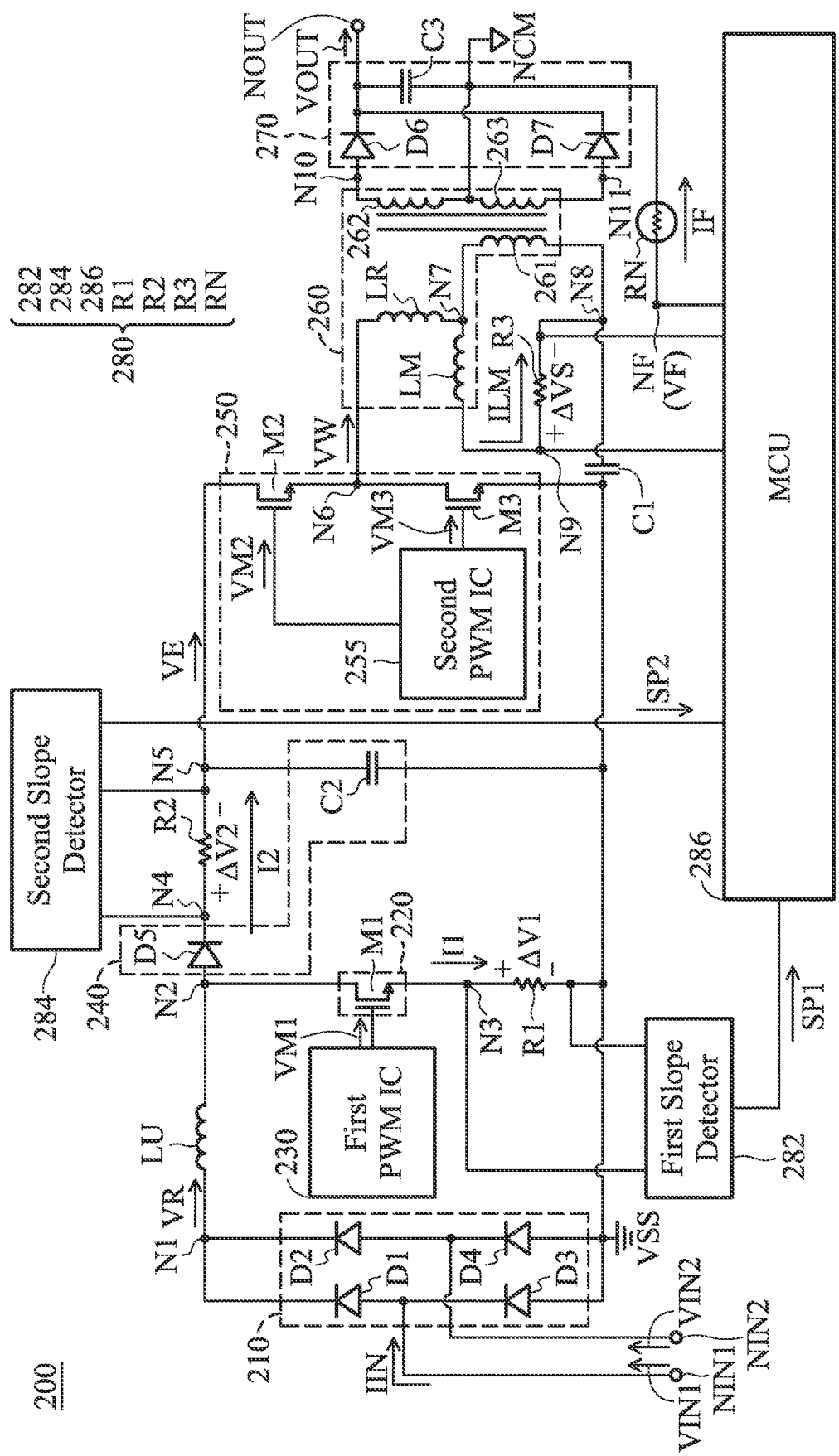
FIG. 2 is a diagram of circuitry of a power supply device according to an embodiment of the invention.

FIG. 2 is a diagram of circuitry of a power supply device 200 according to an embodiment of the invention. In the embodiment of FIG. 2, the power supply device 200 with a first input node NIN1, a second input node NIN2 and an output node NOUT includes a bridge rectifier 210, a boost inductor LU, a power switch element 220, a first PWM IC 230, a first output stage circuit 240, an input switch circuit 250, a transformer 260, a first capacitor C1, a second output stage circuit 270, and a detection and control circuit 280. The first input node NIN1 and the second input node NIN2 of the power supply device 200 are arranged for receiving a first input voltage VIN1 and a second input voltage VIN2 from an external input power source, respectively. The output node NOUT of the power supply device 200 is arranged for outputting an output voltage VOUT to an electronic device (not shown). In addition, an input current IIN enters the power supply device 200 through the first input node NIN1.

The bridge rectifier 210 includes a first diode D1, a second diode D2, a third diode D3, and a fourth diode D4. The first diode D1 has an anode coupled to the first input node NIN1, and a cathode coupled to a first node N1 for outputting a rectified voltage VR. The second diode D2 has an anode coupled to the second input node NIN2, and a cathode coupled to the first node N1. The third diode D3 has an anode coupled to a ground voltage VSS, and a cathode coupled to the first input node NIN1. The fourth diode D4 has an anode coupled to the ground voltage VSS, and a cathode coupled to the second input node NIN2.

The boost inductor LU has a first terminal coupled to the first node N1 for receiving the rectified voltage VR, and a second terminal coupled to a second node N2.

The power switch element 220 includes a first transistor M1. For example, the first transistor M1 may be an NMOSFET (N-type Metal Oxide Semiconductor Field Effect Transistor). The first transistor M1 has a control terminal (e.g., a gate) for receiving a first PWM voltage VM1, a first terminal (e.g., a source) coupled to a third node N3, and a second terminal (e.g., a drain) coupled to the second node N2.

The first PWM IC 230 generates the first PWM voltage VM1. For example, the first PWM voltage VM1 may be maintained at a constant voltage level when the power supply device 200 is initialized. The first PWM voltage VM1 may provide a periodic clock waveform when the power supply device 200 is normally operated.

The first output stage circuit 240 includes a fifth diode D5 and a second capacitor C2. The fifth diode D5 has an anode coupled to the second node N2, and a cathode coupled to a fourth node N4. The second capacitor C2 has a first terminal coupled to a fifth node N5 for outputting a middle voltage VE, and a second terminal coupled to the ground voltage VSS.

The input switch circuit 250 includes a second PWM IC 255, a second transistor M2, and a third transistor M3. The second PWM IC 255 generates a second PWM voltage VM2 and a third PWM voltage VM3. For example, the second PWM voltage VM2 and the third PWM voltage VM3 may be maintained at a constant voltage level when the power supply device 200 is initialized. The second PWM voltage VM2 and the third PWM voltage VM3 may provide periodic clock waveforms when the power supply device 200 is normally operated. In some embodiments, the second PWM voltage VM2 and the third PWM voltage VM3 have complementary logic levels. In alternative embodiments, the second PWM voltage VM2 and the third PWM voltage VM3 have the same waveforms with a phase difference therebetween, such that both of them are not at a high logic level at the same time. Each of the second transistor M2 and the third transistor M3 may be an NMOSFET. The second transistor M2 has a control terminal (e.g., a gate) for receiving the second PWM voltage VM2, a first terminal (e.g., a source) coupled to a sixth node N6 for outputting a switching voltage VW, and a second terminal (e.g., a drain) coupled to the fifth node N5 for receiving the middle voltage VE. The third transistor M3 has a control terminal (e.g., a gate) for receiving the third PWM voltage VM3, a first terminal (e.g., a source) coupled to the ground voltage VSS, and a second terminal (e.g., a drain) coupled to the sixth node N6.

The transformer 260 includes a main coil 261, a first secondary coil 262, and a second secondary coil 263. A leakage inductor LR and a magnetizing inductor LM are built in the transformer 260. The leakage inductor LR and the magnetizing inductor LM are inherent elements, which are generated when the transformer 260 is manufactured, and they are not external independent elements. The leakage inductor LR, the main coil 261, and the magnetizing inductor LM may be positioned at the same side (e.g., the primary side) of the transformer 260. The first secondary coil 262 and the second secondary coil 263 may be positioned at the opposite side (e.g., the secondary side isolated from the primary side) of the transformer 260. The leakage inductor LR has a first terminal coupled to the sixth node N6 for receiving the switching voltage VW, and a second terminal coupled to a seventh node N7. The main coil 261 has a first terminal coupled to the seventh node N7, and a second terminal coupled to an eighth node N8. The magnetizing inductor LM has a first terminal coupled to the seventh node N7, and a second terminal coupled to a ninth node N9. The first capacitor C1 has a first terminal coupled to the eighth node N8, and a second terminal coupled to the ground voltage VSS. In some embodiments, a resonant tank may be formed by the leakage inductor LR, the magnetizing inductor LM, and the first capacitor C1. The first secondary coil 262 has a first terminal coupled to a tenth node N10, and a second terminal coupled to a common node NCM. For example, the common node NCM may be considered as another ground voltage, which may be the same as or different from the aforementioned ground voltage VSS. The second secondary coil 263 has a first terminal coupled to the common node NCM, and a second terminal coupled to an eleventh node N11.

The second output stage circuit 270 includes a sixth diode D6, a seventh diode D7, and a third capacitor C3. The sixth diode D6 has an anode coupled to the tenth node N10, and a cathode coupled to the output node NOUT. The seventh diode D7 has an anode coupled to the eleventh node N11, and a cathode coupled to the output node NOUT. The third capacitor C3 has a first terminal coupled to the output node NOUT, and a second terminal coupled to the common node NCM.

The detection and control circuit 280 includes a first slope detector 282, a second slope detector 284, an MCU (Microcontroller Unit) 286, a first resistor R1, a second resistor R2, a third resistor R3, and an NTC resistor RN.

The first resistor R1 has a first terminal coupled to the third node N3, and a second terminal coupled to the ground voltage VSS. That is, the first resistor R1 is coupled in series with the first transistor M1. The first slope detector 282 is respectively coupled to the third node N3 and the ground voltage VSS, so as to monitor a first voltage difference $\Delta V1$ across the first resistor R1. Next, the first slope detector 282 can calculate a first voltage slope SP1 according to the first voltage difference $\Delta V1$. The second resistor R2 has a first terminal coupled to the fourth node N4, and a second terminal coupled to the fifth node N5. That is, the second resistor R2 is coupled in series with the fifth diode D5. The second slope detector 284 is respectively coupled to the fourth node N4 and the fifth node N5, so as to monitor a second voltage difference $\Delta V2$ across the second resistor R2. Next, the second slope detector 284 can calculate a second voltage slope SP2 according to the second voltage difference $\Delta V2$.

Figure 3:
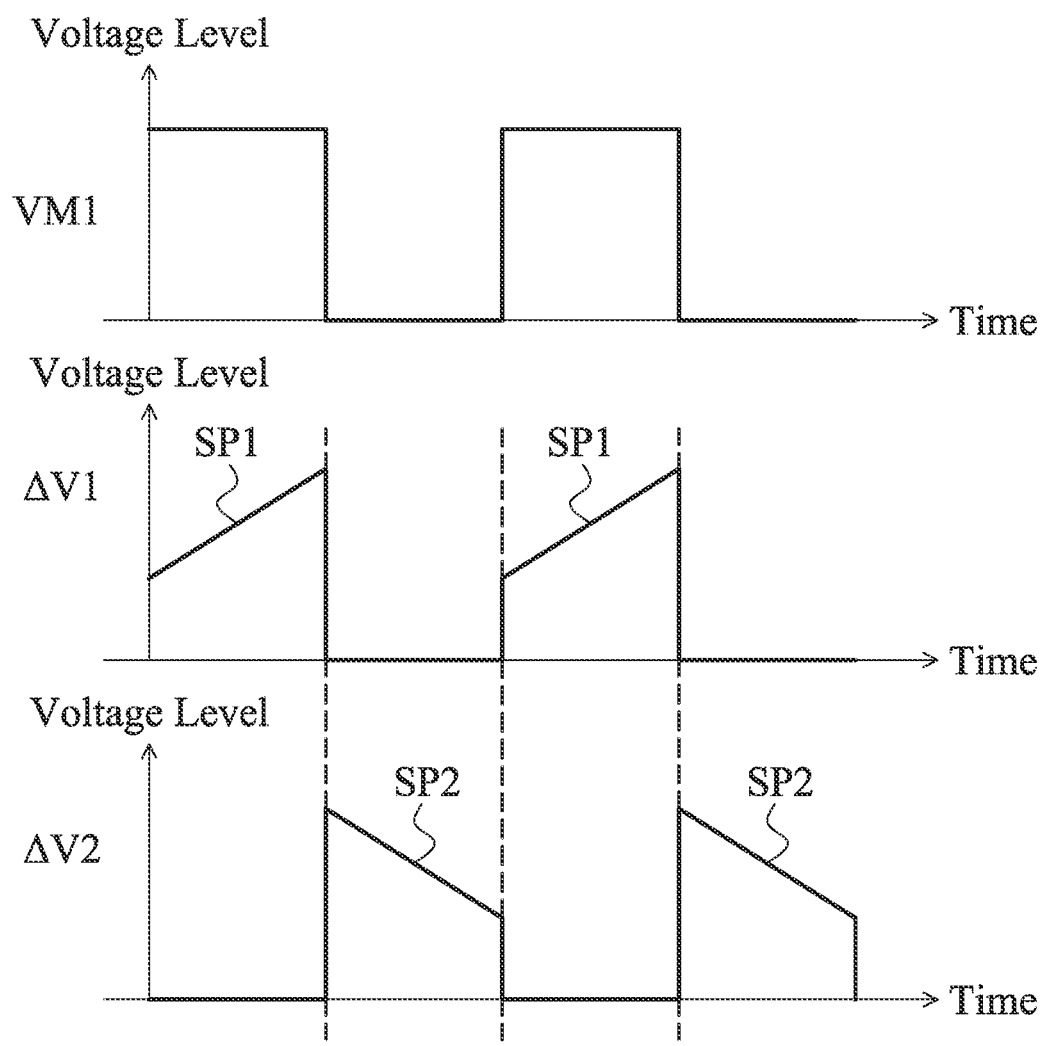
FIG. 3 is a diagram of voltage waveforms of a power supply device according to an embodiment of the invention.

FIG. 3 is a diagram of voltage waveforms of the power supply device 200 according to an embodiment of the invention. It should be understood that when the first PWM voltage VM1 has a high logic level, a first current I1 flowing through the first transistor M1 and the first resistor R1 may be gradually increased, and a second current I2 flowing through the fifth diode D5 and the second resistor R2 may be maintained at 0. Conversely, when the first PWM voltage VM1 has a low logic level, the aforementioned first current I1 may be maintained at 0, and the aforementioned second current I2 may be gradually decreased. The first resistor R1 may be a sensing resistor with a very low resistance. The first voltage difference $\Delta V1$ of the first resistor R1 may correspond to the aforementioned first current I1. The second resistor R2 may be another sensing resistor with a very low resistance. The second voltage difference $\Delta V2$ of the second resistor R2 may correspond to the aforementioned second current I2. According to the measurement of FIG. 3, the first slope detector 282 can obtain the relative information of the first voltage slope SP1 and the first current I1 by analyzing the first voltage difference $\Delta V1$. In addition, the second slope detector 284 can obtain the relative information of the second voltage slope SP2 and the second current I2 by analyzing the second voltage difference $\Delta V2$.

The MCU 286 receives the first voltage slope SP1 and the second voltage slope SP2 from the first slope detector 282 and the second slope detector 284, respectively. Furthermore, the MCU 286 outputs a constant current IF to a feedback node NF. The NTC resistor RN is adjacent to the transformer 260. The NTC resistor RN has a first terminal coupled to the feedback node NF, and a second terminal coupled to the common node NCM. For example, if the temperature of the transformer 260 becomes higher, the resistance of the NTC resistor RN may be decreased. Conversely, if the temperature of the transformer 260 becomes lower, the resistance of the NTC resistor RN may be increased. Then, the MCU 286 can determine a voltage-difference upper-bound VUB and a voltage-difference lower-bound VLB according to a feedback voltage VF at the feedback node NF.

Figure 4:
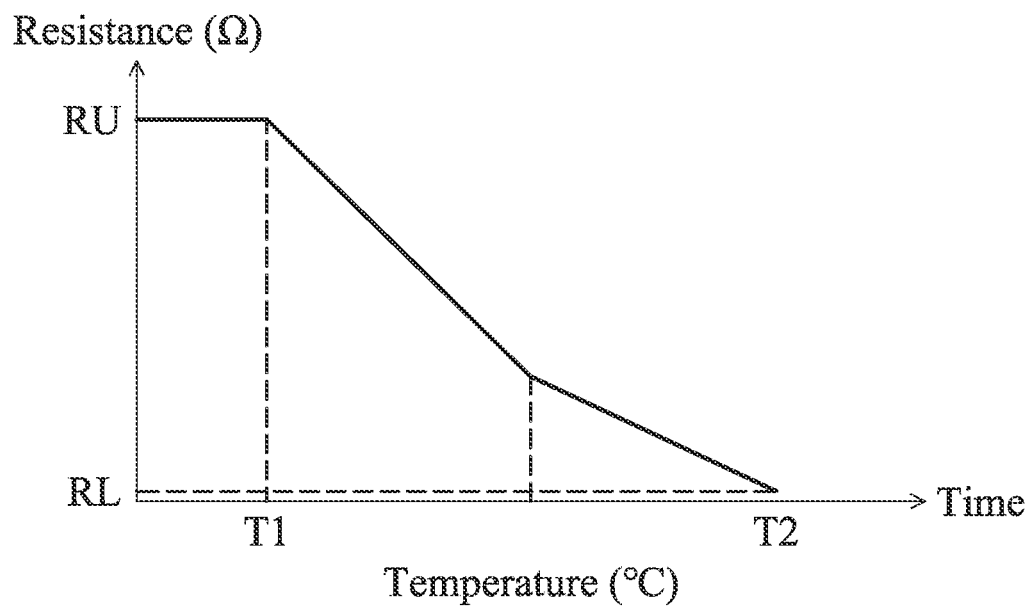
FIG. 4 is a diagram of operational characteristics of an NTC (Negative Temperature Coefficient) resistor according to an embodiment of the invention.

FIG. 4 is a diagram of operational characteristics of the NTC resistor RN according to an embodiment of the invention. In the embodiment of FIG. 4, the temperature of the transformer 260 is from a first temperature T1 to a second temperature T2, and the temperature of the NTC resistor RN is substantially the same as that of the transformer 260. When the temperature of the transformer 260 is decreased to the first temperature T1, the NTC resistor RN provides a resistance upper-bound RU. When the temperature of the transformer 260 is increased to the second temperature T2, the NTC resistor RN provides a resistance lower-bound RL. In some embodiments, the MCU 286 can calculate the voltage-difference upper-bound VUB and the voltage-difference lower-bound VLB according to the following equations (1) and (2):

$$\text{VUB}=\text{IF}\cdot\text{RU}\cdot\text{K} \tag{1}$$

$$\text{VLB}=\text{IF}\cdot\text{RL}\cdot\text{K} \tag{2}$$

where "VUB" represents the voltage-difference upper-bound VUB, "VLB" represents the voltage-difference lower-bound VLB, "RU" represents the resistance upper-bound RU, "RL" represents the resistance lower-bound RL, "IF" represents the current magnitude of the constant current IF, and "K" represents any magnification ratio (which is adjustable according to different requirements).

The third resistor R3 has a first terminal coupled to the ninth node N9, and a second terminal coupled to the eighth node N8. That is, the third resistor R3 is coupled in series with the magnetizing inductor LM of the transformer 260. The third resistor R3 may be another sensing resistor with a very low resistance. According to Ohm's Law, a specific voltage difference ΔVS across the third resistor R3 corresponds to an inductive current ILM flowing through the magnetizing inductor LM. Generally, the MCU 286 can limit the inductive current ILM by controlling the specific voltage difference ΔVS, so as to prevent the magnetizing inductor LM from accidentally entering a state of magnetic saturation.

Figure 5:
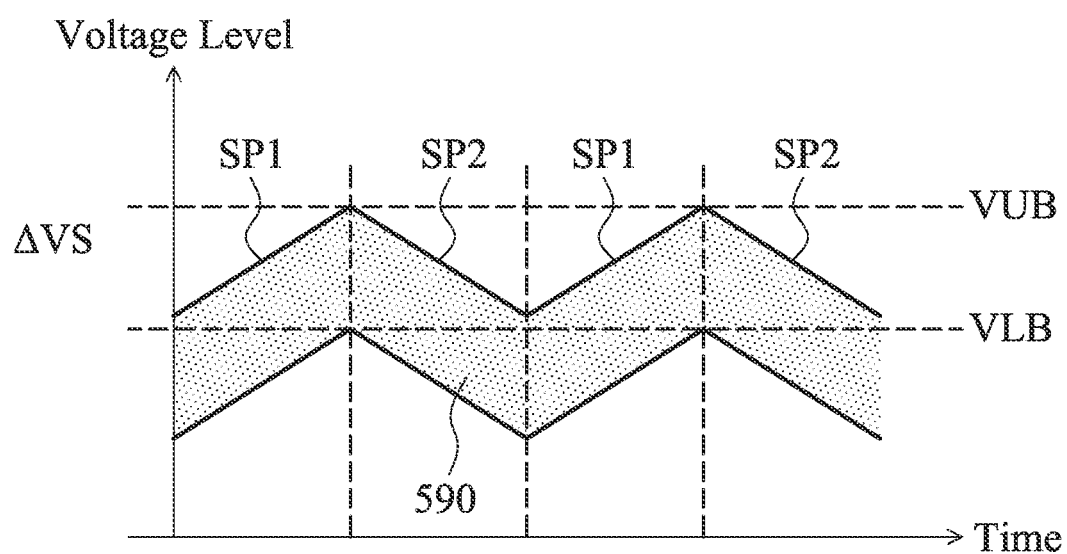
FIG. 5 is a diagram of a waveform of a specific voltage difference according to an embodiment of the invention.

FIG. 5 is a diagram of a waveform of the specific voltage difference ΔVS according to an embodiment of the invention. In the embodiment of FIG. 5, a possible range 590 of the specific voltage difference AVS is determined according to the first voltage slope SP1, the second voltage slope SP2, the voltage-difference upper-bound VHB, and the voltage-difference lower-bound VLB. According to practical measurements, if the specific voltage difference AVS fall within the possible range 590, it can ensure that the magnetizing inductor LM is operated normally, without entering a non-ideal state of magnetic saturation.

Figure 6:
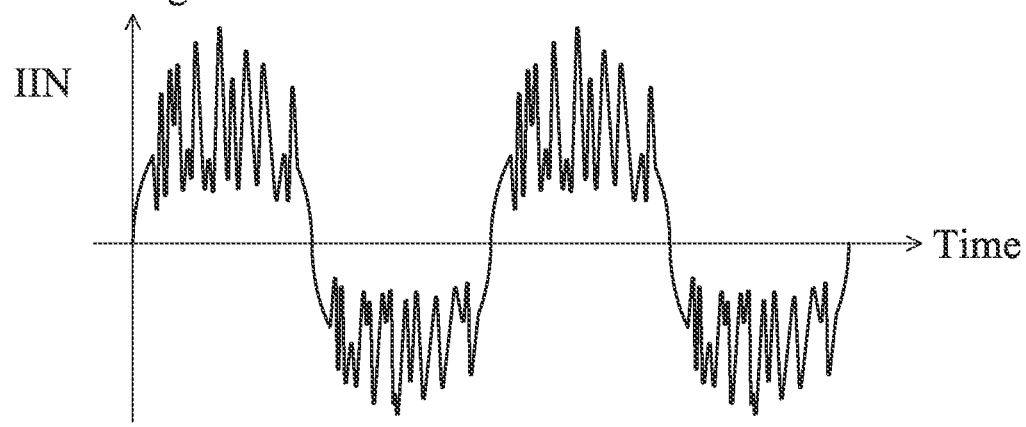
FIG. 6 is a diagram of current waveforms of a conventional power supply device.
Figure 6:
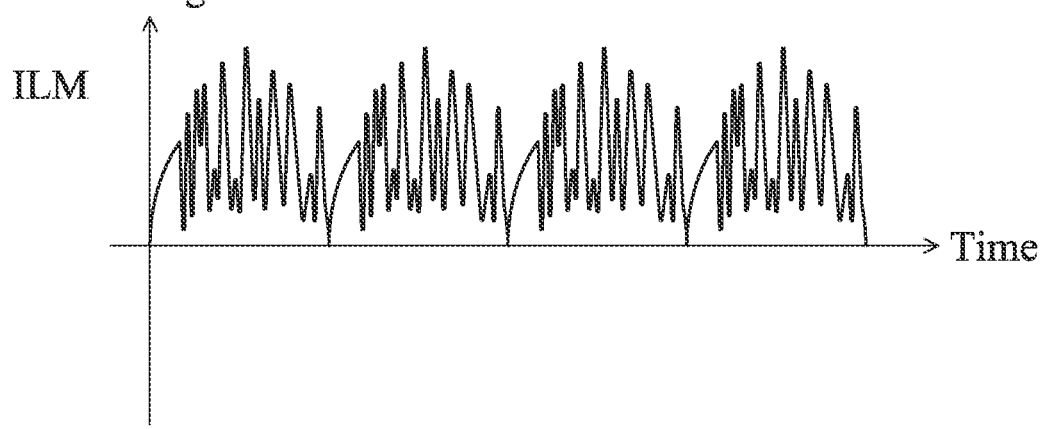

FIG. 6 is a diagram of current waveforms of a conventional power supply device. As shown in FIG. 6, when the temperature of the conventional power supply device is too high, its input current IIN and inductive current ILM may have a lot of abnormal fluctuations due to the magnetic saturation.

Figure 7:
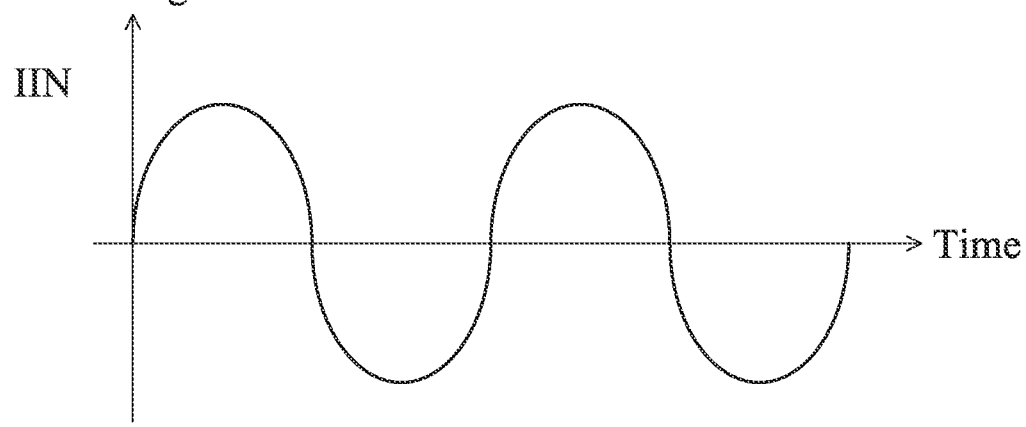
FIG. 7 is a diagram of current waveforms of a power supply device according to an embodiment of the invention.
Figure 7:
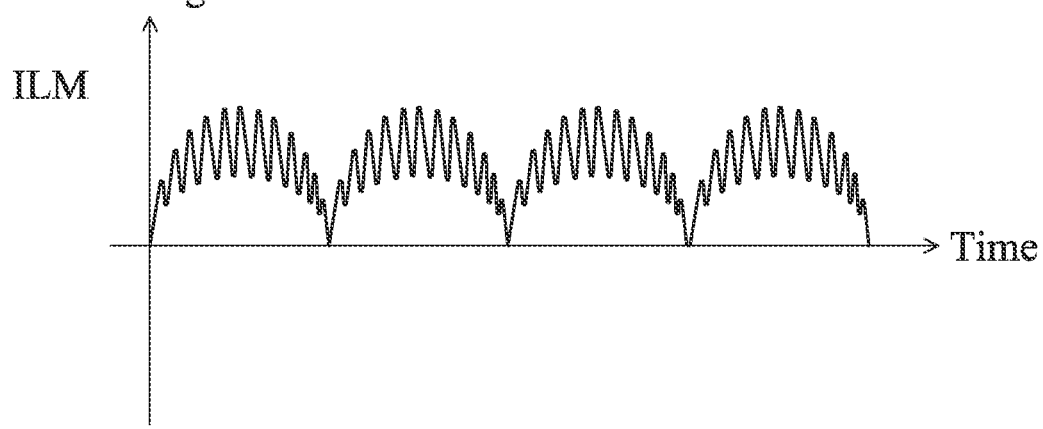

FIG. 7 is a diagram of current waveforms of the power supply device 200 according to an embodiment of the invention. According to the embodiment of FIG. 7, the magnetizing inductor LM can be operated normally by using the current limitations of the invention. The magnetizing inductor LM will not enter the state of magnetic saturation even if the temperature of the transformer 260 is relatively high. In addition, the abnormal fluctuations of the input current IIN and the inductive current ILM can be completely eliminated.

The invention proposes a novel power supply device for effectively suppressing the non-ideal magnetic saturation. According to practical measurements, the power supply device using the aforementioned design can provide much higher security, and therefore it is suitable for application in a variety of devices.

Note that the above voltages, currents, resistances, inductances, capacitances and other element parameters are not limitations of the invention. A designer can adjust these settings according to different requirements. The power supply device of the invention is not limited to the configurations of FIGS. 1-7. The invention may merely include any one or more features of any one or more embodiments of FIGS. 1-7. In other words, not all of the features displayed in the figures should be implemented in the power supply device of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A power supply device for suppressing magnetic saturation, comprising:
    a bridge rectifier, generating a rectified voltage according to a first input voltage and a second input voltage;
    a boost inductor, receiving the rectified voltage;
    a power switch element, selectively coupling the boost inductor to a ground voltage according to a first PWM (Pulse Width Modulation) voltage;
    a first PWM IC (Integrated Circuit), generating the first PWM voltage;
    a first output stage circuit, coupled to the boost inductor, and generating a middle voltage;
    an input switch circuit, generating a switching voltage according to the middle voltage;
    a transformer, comprising a main coil, a first secondary coil, and a second secondary coil, wherein a leakage inductor and a magnetizing inductor are built in the transformer, and the main coil receives the switching voltage through the leakage inductor;
    a first capacitor, coupled to the main coil;
    a second output stage circuit, coupled to the first secondary coil and the second secondary coil, and generating an output voltage; and
    a detection and control circuit, comprising an NTC (Negative Temperature Coefficient) resistor adjacent to the transformer, wherein the detection and control circuit detects a first voltage slope relative to the power switch element, and detects a second voltage slope relative to the first output stage circuit;
    wherein the detection and control circuit limits an inductive current flowing through the magnetizing inductor according to the first voltage slope, the second voltage slope, and a feedback voltage from the NTC resistor.

2. The power supply device as claimed in claim 1, wherein the bridge rectifier comprises:
    a first diode, wherein the first diode has an anode coupled to a first input node for receiving the first input voltage, and a cathode coupled to a first node for outputting the rectified voltage;
    a second diode, wherein the second diode has an anode coupled to a second input node for receiving the second input voltage, and a cathode coupled to the first node;
    a third diode, wherein the third diode has an anode coupled to the ground voltage, and a cathode coupled to the first input node; and
    a fourth diode, wherein the fourth diode has an anode coupled to the ground voltage, and a cathode coupled to the second input node;
    wherein the boost inductor has a first terminal coupled to the first node for receiving the rectified voltage, and a second terminal coupled to a second node.

3. The power supply device as claimed in claim 2, wherein the power switch element comprises:
a first transistor, wherein the first transistor has a control terminal for receiving the first PWM voltage, a first terminal coupled to a third node, and a second terminal coupled to the second node.

4. The power supply device as claimed in claim 3, wherein the first output stage circuit comprises:
a fifth diode, wherein the fifth diode has an anode coupled to the second node, and a cathode coupled to a fourth node; and
a second capacitor, wherein the second capacitor has a first terminal coupled to a fifth node for outputting the middle voltage, and a second terminal coupled to the ground voltage.

5. The power supply device as claimed in claim 4, wherein the detection and control circuit further comprises:
a first resistor, wherein the first resistor has a first terminal coupled to the third node, and a second terminal coupled to the ground voltage; and
a first slope detector, monitoring the first resistor, so as to obtain the first voltage slope.

6. The power supply device as claimed in claim 5, wherein the detection and control circuit further comprises:
a second resistor, wherein the second resistor has a first terminal coupled to the fourth node, and a second terminal coupled to the fifth node; and
a second slope detector, monitoring the second resistor, so as to obtain the second voltage slope.

7. The power supply device as claimed in claim 4, wherein the input switch circuit comprises:
a second PWM IC, generating a second PWM voltage and a third PWM voltage;
a second transistor, wherein the second transistor has a control terminal for receiving the second PWM voltage, a first terminal coupled to a sixth node for outputting the switching voltage, and a second terminal coupled to the fifth node for receiving the middle voltage; and
a third transistor, wherein the third transistor has a control terminal for receiving the third PWM voltage, a first terminal coupled to the ground voltage, and a second terminal coupled to the sixth node.

8. The power supply device as claimed in claim 7, wherein the leakage inductor has a first terminal coupled to the sixth node for receiving the switching voltage, and a second terminal coupled to a seventh node, wherein the main coil has a first terminal coupled to the seventh node, and a second terminal coupled to an eighth node, and wherein the magnetizing inductor has a first terminal coupled to the seventh node, and a second terminal coupled to a ninth node.

9. The power supply device as claimed in claim 8, wherein the first capacitor has a first terminal coupled to the eighth node, and a second terminal coupled to the ground voltage.

10. The power supply device as claimed in claim 9, wherein the first secondary coil has a first terminal coupled to a tenth node, and a second terminal coupled to a common node, and wherein the second secondary coil has a first terminal coupled to the common node, and a second terminal coupled to an eleventh node.

11. The power supply device as claimed in claim 10, wherein the second output stage circuit comprises:
a sixth diode, wherein the sixth diode has an anode coupled to the tenth node, and a cathode coupled to an output node for outputting the output voltage;
a seventh diode, wherein the seventh diode has an anode coupled to the eleventh node, and a cathode coupled to the output node; and
a third capacitor, wherein the third capacitor has a first terminal coupled to the output node, and a second terminal coupled to the common node.

12. The power supply device as claimed in claim 10, wherein the detection and control circuit further comprises:
an MCU (Microcontroller Unit), outputting a constant current to a feedback node, wherein the NTC resistor has a first terminal coupled to the feedback node, and a second terminal coupled to the common node.

13. The power supply device as claimed in claim 12, wherein the MCU determines a voltage-difference upper-bound and a voltage-difference lower-bound according to the feedback voltage at the feedback node.

14. The power supply device as claimed in claim 13, wherein the detection and control circuit further comprises:
a third resistor, wherein the third resistor has a first terminal coupled to the ninth node, and a second terminal coupled to the eighth node;
wherein the MCU limits the inductive current flowing through the magnetizing inductor by controlling a specific voltage difference of the third resistor.

15. The power supply device as claimed in claim 14, wherein a possible range of the specific voltage difference is determined according to the first voltage slope, the second voltage slope, the voltage-difference upper-bound, and the voltage-difference lower-bound.

* * * * *